(12) United States Patent
Lobl et al.

(10) Patent No.: US 7,766,589 B2
(45) Date of Patent: Aug. 3, 2010

(54) FIXING SYSTEM

(75) Inventors: Igor Lobl, Yverdon-les-Bains (CH); Stephane Clerc, Gland (CH)

(73) Assignee: Stilock S.A., Yverdon-les-Bains (CH)

( * ) Notice: Subject to any disclaimer, the term of this patent is extended or adjusted under 35 U.S.C. 154(b) by 716 days.

(21) Appl. No.: 11/664,764

(22) PCT Filed: Oct. 7, 2005

(86) PCT No.: PCT/IB2005/003152

§ 371 (c)(1),
(2), (4) Date: Apr. 5, 2007

(87) PCT Pub. No.: WO2006/038117

PCT Pub. Date: Apr. 13, 2006

(65) Prior Publication Data

US 2008/0054129 A1 Mar. 6, 2008

(30) Foreign Application Priority Data

Oct. 8, 2004 (CH) .................................... 1666/04

(51) Int. Cl.
*B60P 7/08* (2006.01)
(52) U.S. Cl. ........................ 410/94; 410/91; 410/121
(58) Field of Classification Search .................. 410/80, 410/90, 91, 94, 95, 121; 224/403, 404, 42.33, 224/555, 567; 296/37.6; 248/351
See application file for complete search history.

(56) References Cited

U.S. PATENT DOCUMENTS

| 3,214,816 A | 11/1965 | Mathison |
| 3,247,559 A | 4/1966 | Mathison |
| 3,247,848 A | 4/1966 | Mathison |
| 3,261,069 A | 7/1966 | Mathison |
| 4,941,784 A * | 7/1990 | Flament .................... 410/121 |
| 6,412,142 B1 | 7/2002 | Iverson |

FOREIGN PATENT DOCUMENTS

| EP | 0 704 176 A1 | 4/1996 |
| WO | WO 99/28148 A1 | 6/1999 |

* cited by examiner

*Primary Examiner*—Stephen Gordon
(74) *Attorney, Agent, or Firm*—Baker & Daniels LLP

(57) ABSTRACT

Fixing system adapted to be fixed in a removable manner on a penetrable surface, the fixing system comprising a housing base part and a pair of pin blocks mounted in the housing. Each pin block comprises a rigid body portion and a plurality of pins inclined obliquely in relation to said body portion. The pins of one pin block are oriented in a direction opposed to the direction of the pins of the other pin block, whereby an actuator mechanism moves the pin blocks apart or together, from a disengaged position to an engaged and stable position.

15 Claims, 14 Drawing Sheets

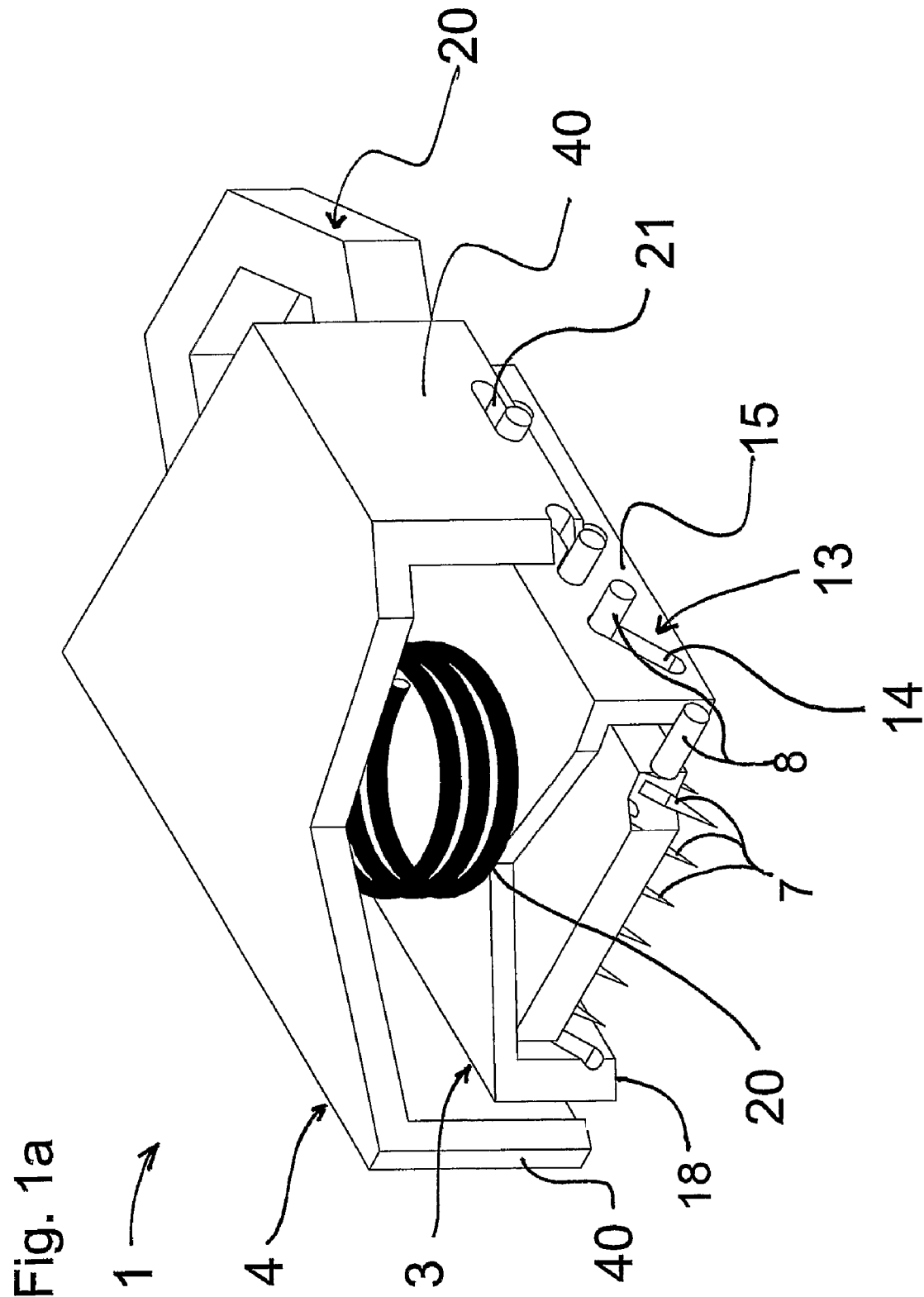

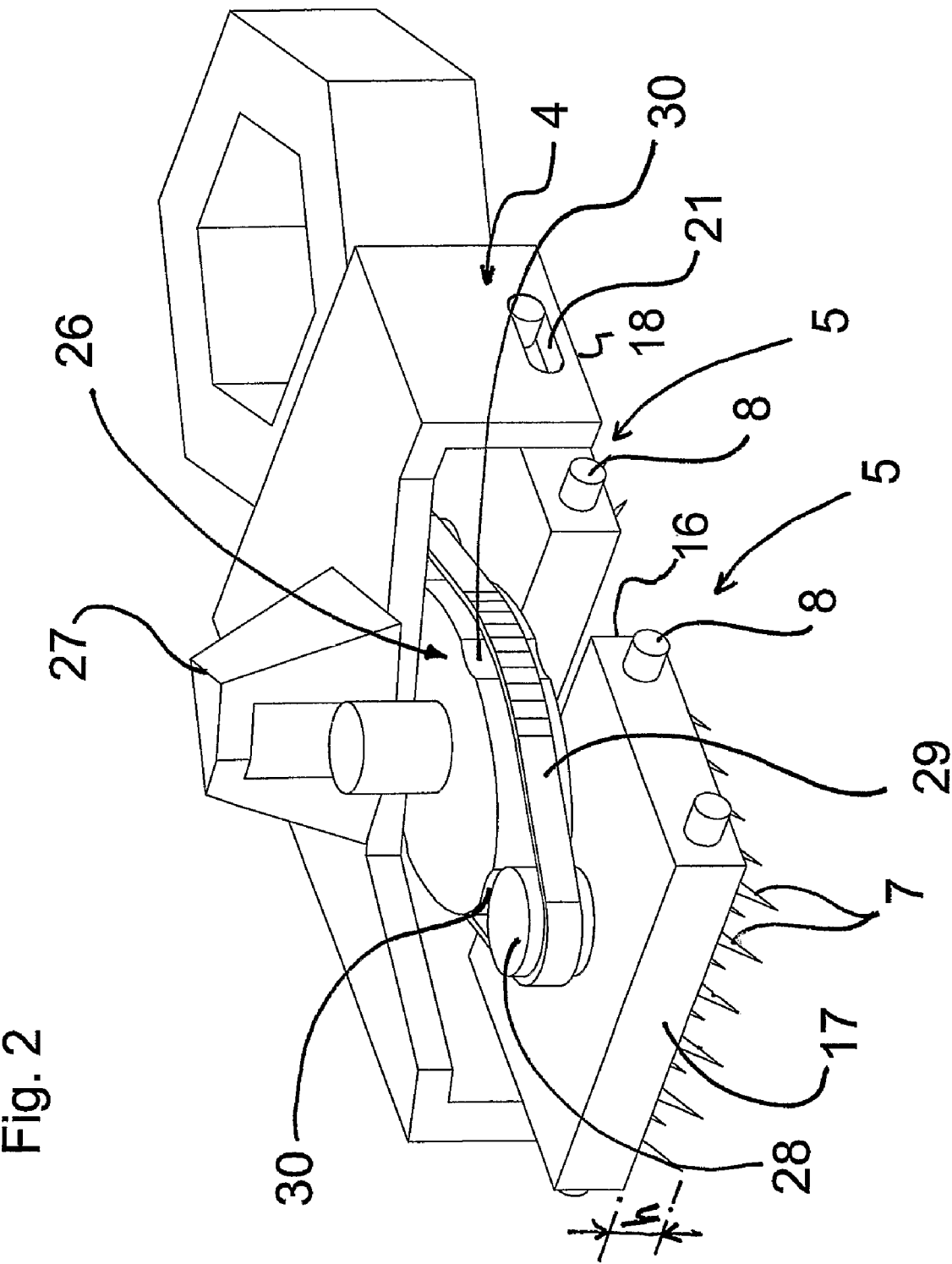

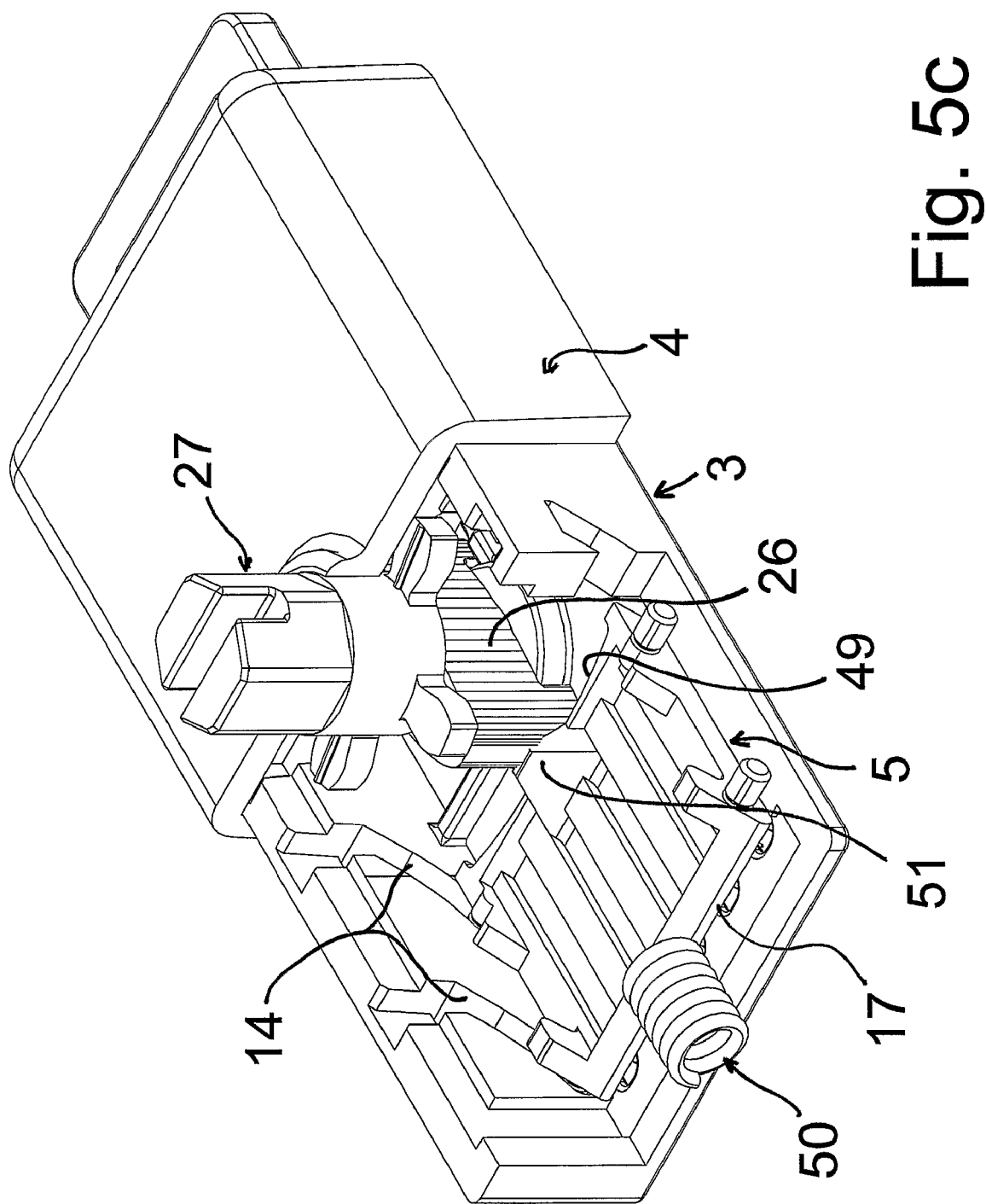

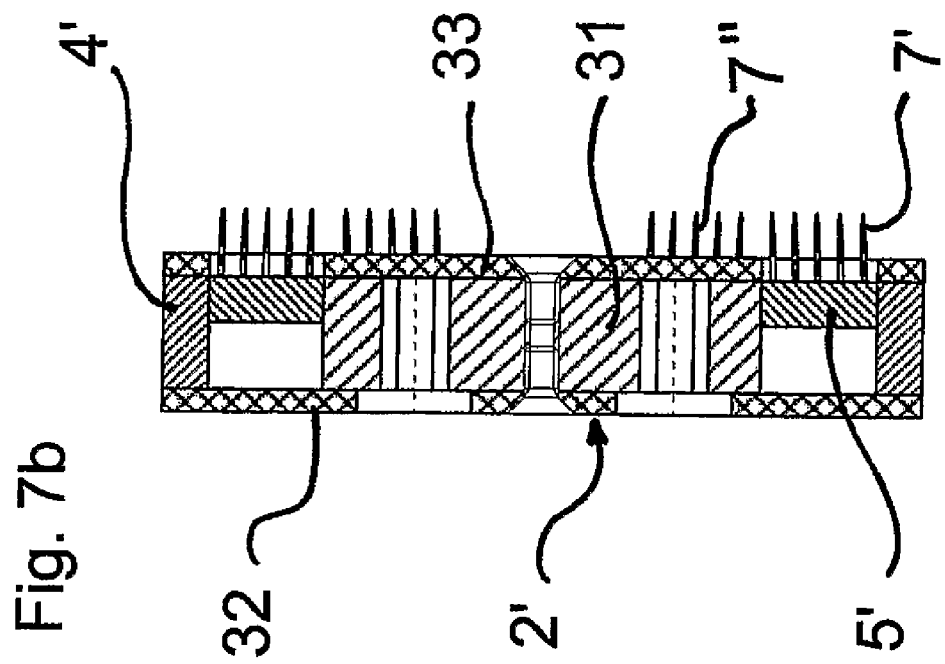
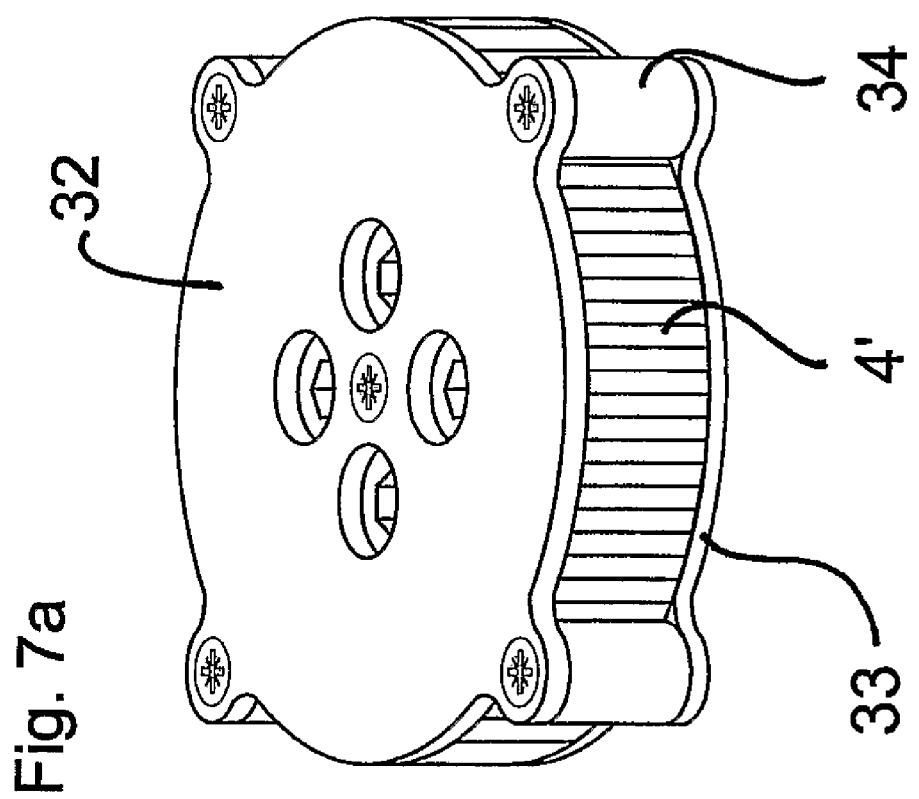

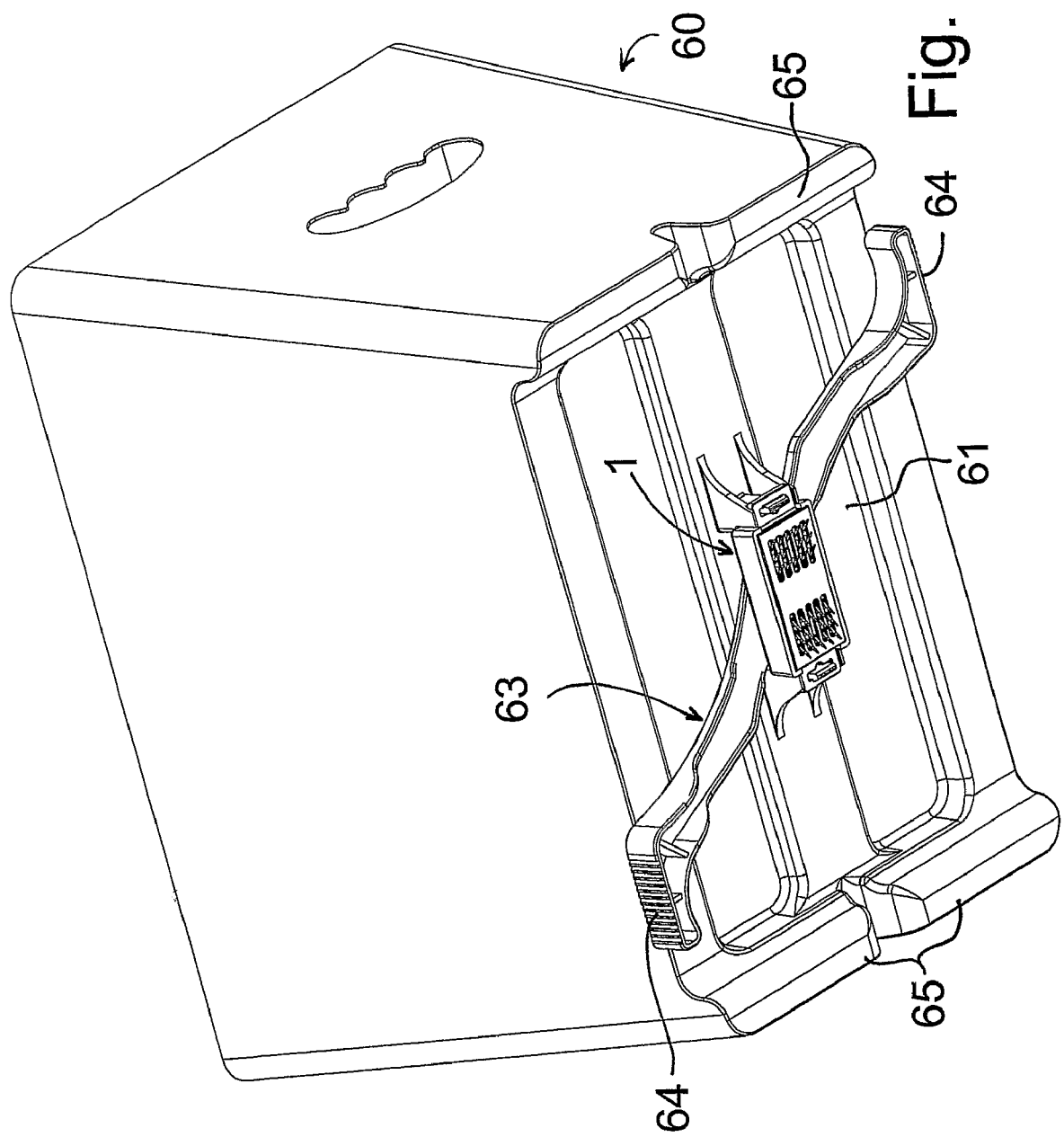

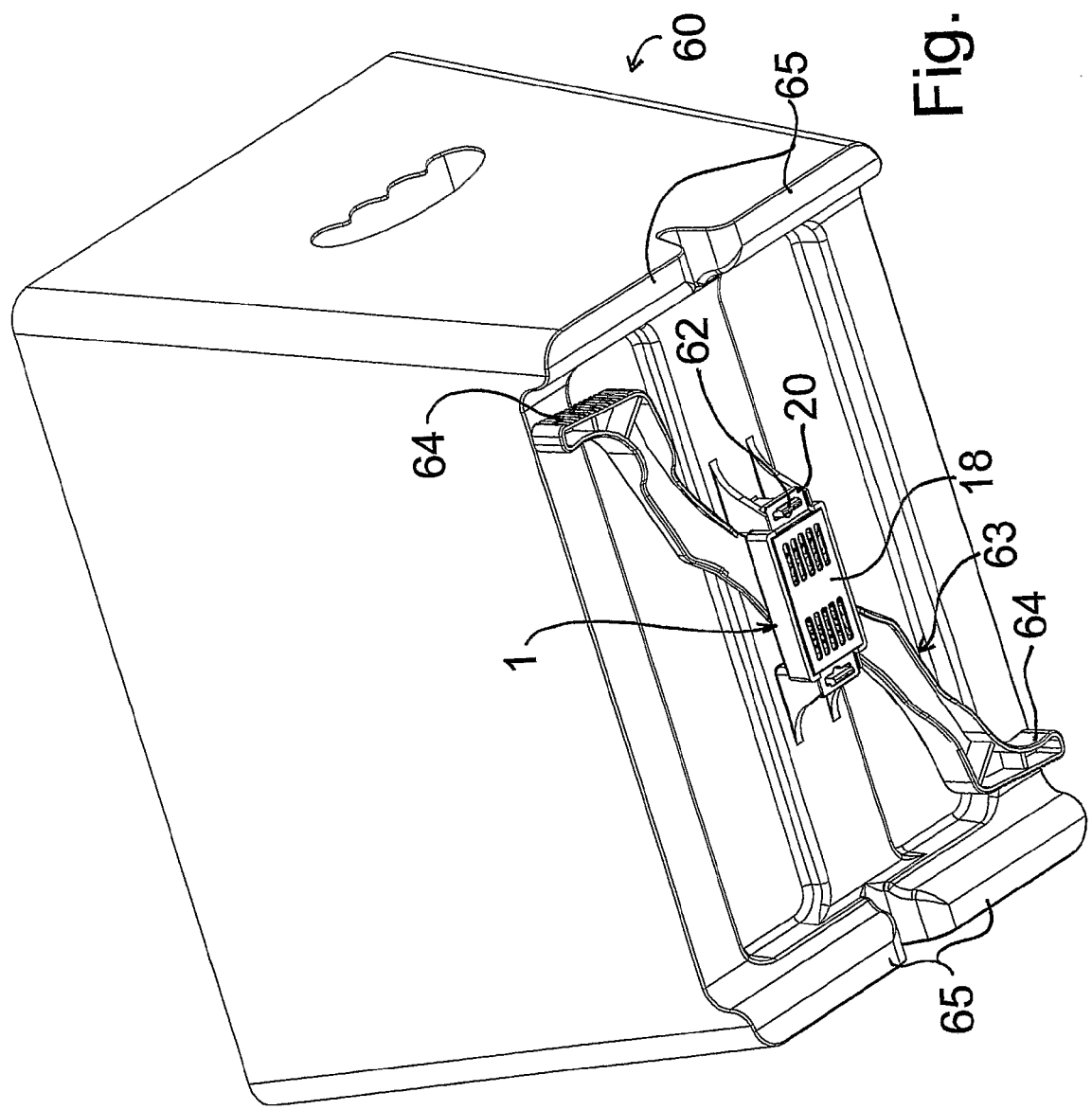

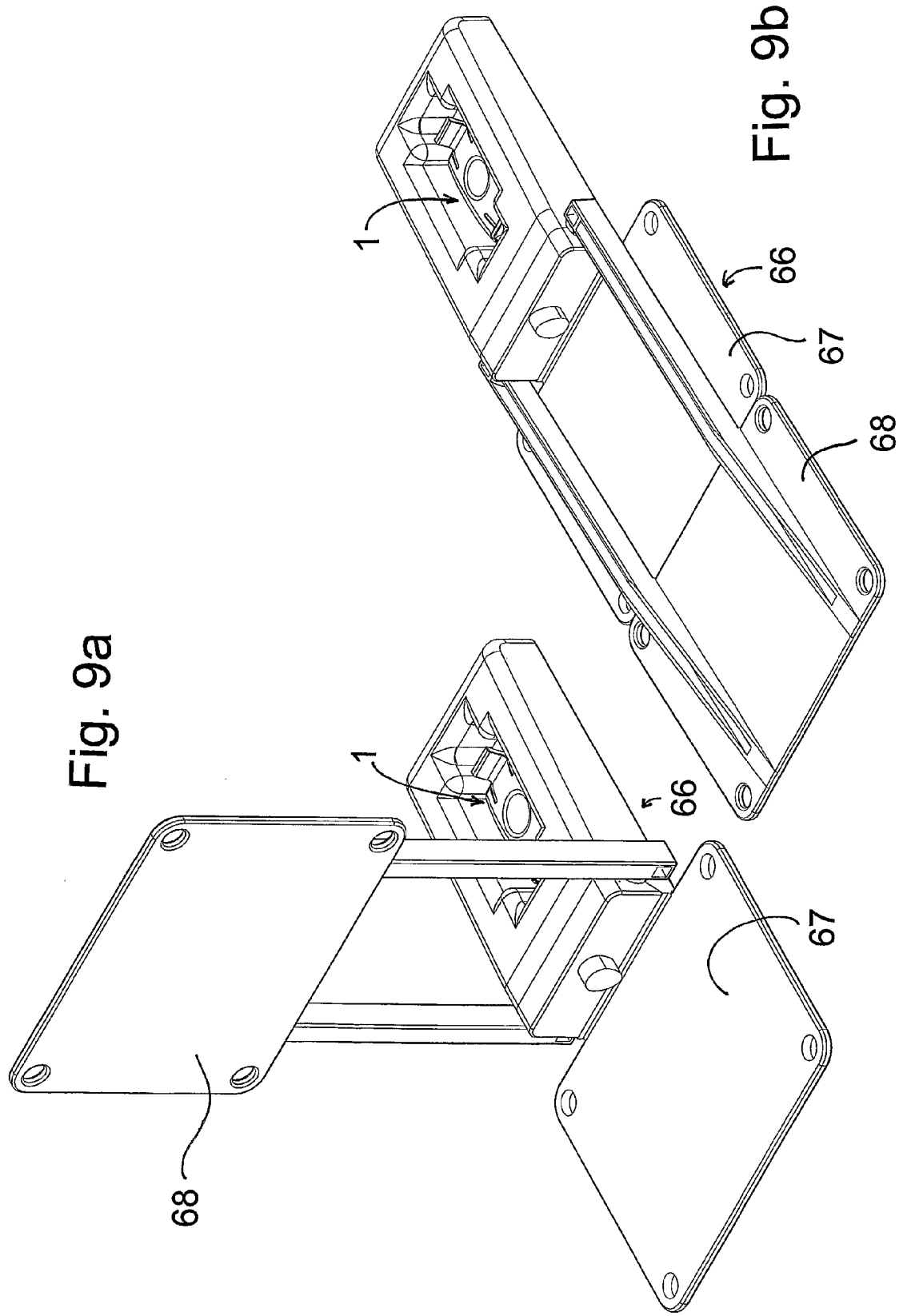

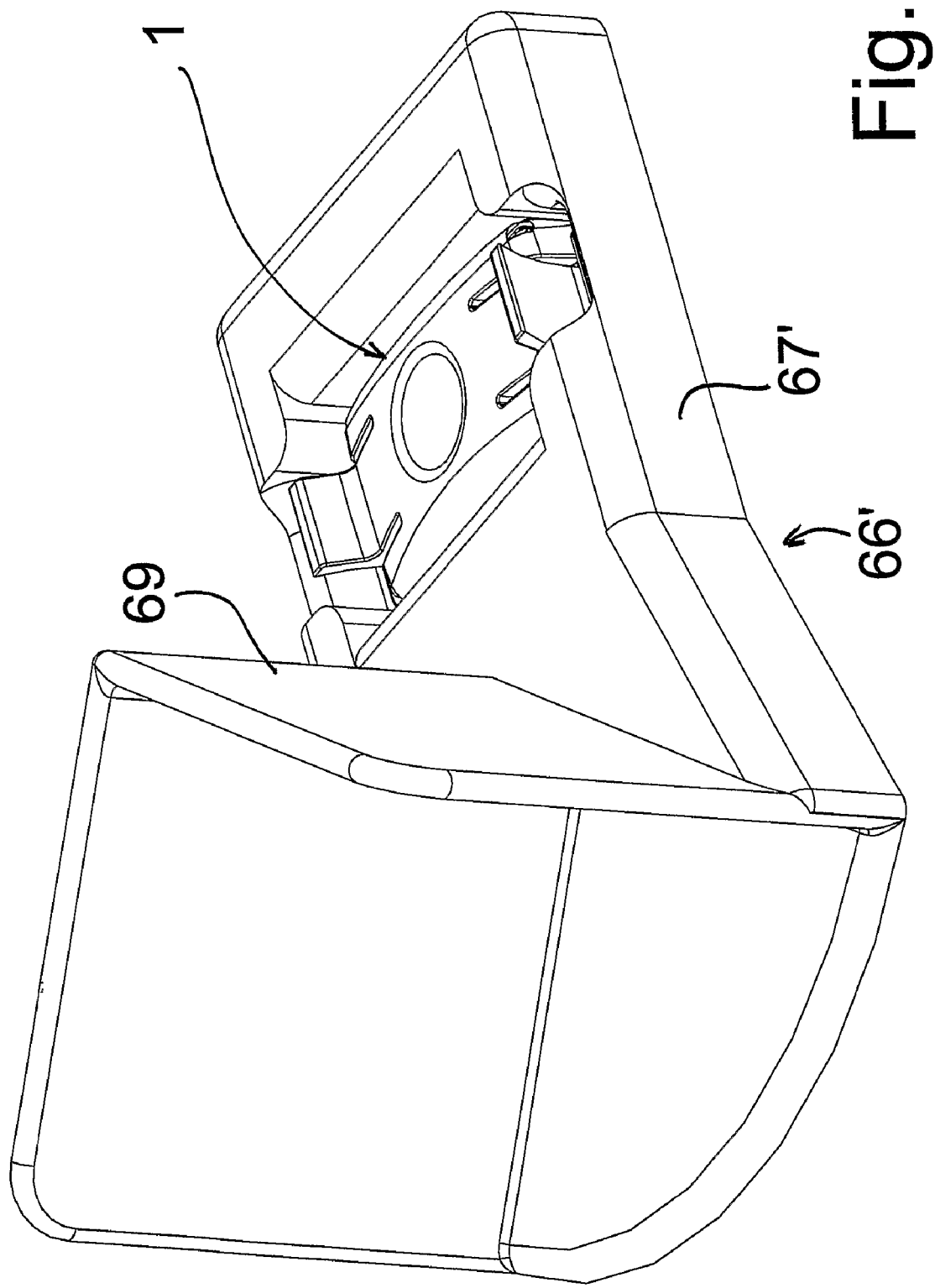

FIXING SYSTEM

The present invention relates to a device for immobilizing a load or fixing an object on a penetrable surface, such as a carpeted surface or other textile or fibrous surfaces, in a removable and essentially non-destructive manner.

The invention relates in particular, but not exclusively, to a device for immobilizing loads transported in moving vehicles and more particularly for immobilizing goods transported in the trunks of automobiles.

Many systems for preventing movement of goods transported in trunk of an automobile have been proposed. Most conventional systems fall within the following categories:

elastic nets or bands that hold goods down on the floor or in pockets in walls of the trunk hooks on the roof or the sides of the trunk to hang goods, in particular shopping or other bags separating elements or trays that compartmentalize the trunk All of these conventional systems have important drawbacks: nets are ill suited to immobilize voluminous objects or objects that do not support crushing forces, such as certain groceries; hooks cannot hold objects other than bags with handles; and separating elements are often cumbersome to organise optimally, and they take up space and hamper loading of large objects in the trunk. Unless the compartment size fits the size of the object to be transported, there is still the problem of movement of the objects in the compartments. Moreover, most known systems are not very versatile and do not allow objects of all sorts of shapes and sizes to be easily arranged and immobilized in any position in the trunk of the vehicle.

The inventors of the present invention have realised that in order to provide a system to prevent transported goods from shifting around in the trunk, considering the range of different shapes and sizes that such goods may have, it is more effective to provide a system that wedges or secures goods in any chosen position in the trunk, for example against a wall, a corner, or a movable and securable retaining object, rather than to use a system provided in a fixed or predefined region of the trunk as found in conventional systems. Moreover the inventors have observed that the vast majority of passenger vehicles are provided with carpeted surfaces.

Various systems for fixing articles to a fibrous textile surface have been proposed, one of the most common commercial systems being known as VELCRO, which consists of piece of fabric comprising a large plurality of tiny hooks that catch into loops of the fibrous surface to which it is applied. VELCRO systems however are not well suited for bonding to certain textile surfaces, such as very dense or short and straight haired carpets. Moreover the bonding strength of VELCRO systems deteriorates relatively rapidly with frequent application and removal.

Another type of textile fastener is disclosed in U.S. Pat. No. 3,261,069, U.S. Pat. No. 3,247,559, U.S. Pat. No. 3,214,816 and U.S. Pat. No. 3,247,848. These patents describe fasteners made of a molded polymer or resin, comprising a thin and flexible supporting base from which two sets of obliquely angled pins extend in opposed directions. The two sets of pins are interconnected by an elastic portion that allows the pin sets to be moved together or apart and to engage in the fabric with the spring force provided by the elastic portion when released. The aforementioned fastener is however not adapted to support large forces in view of its elasticity. Moreover, use of such a fastener has not been contemplated of the immobilisation of inertial loads.

A general object of the invention is to provide a versatile and effective system for fixing an object to a surface with a carpet or other textile or fibrous properties, in a removable and non-destructive manner.

A particular object of the invention is to provide a versatile and effective system for immobilizing loads transported in a vehicle, and especially loads transported in a trunk of a passenger vehicle, in a removable and non-destructive manner.

It is advantageous to provide a fixing system that is easy to engage and disengage.

It is further advantageous to provide a fixing system that is compact and that can be easily assembled to various different objects.

It is further advantageous to provide a fixing system that is adapted to immobilize loads in a large range of sizes, shapes and weight.

It is further advantageous to provide a fixing system that can be fixed to a large variety of fibrous or textile surfaces, including dense or short fibre surfaces.

Objects of the invention have been achieved by the described fixing device.

Disclosed herein is a fixing system adapted to be fixed in a removable and essentially non-destructive manner on a penetrable surface such as a carpet or a piece of textile, said system comprising a housing, a pair of pin blocks mounted in the housing, each pin block comprising a rigid body portion and a plurality of pins inclined obliquely in relation to said body portion, the pins of one pin block oriented in a direction opposed to the direction of the pins of the other pin block, and an actuator mechanism adapted to move the pin blocks apart or together, from a disengaged position to an engaged and blocked position. The mechanism for blocking the pin blocks in the engaged position may be provided as part of the actuation mechanism or separately therefrom.

The pin blocks may advantageously be provided with guide portions, for example in the form of shafts protruding from opposite sides of the body portion, cooperating with complementary guide portions in the housing, for example in the form of slots or grooves in side walls of the housing. The angle of the guide slots relative to a mounting face of the housing may advantageously be greater at the disengaged end than at the engaged end. The guide shafts of each pin block are preferably provided proximate opposite ends of the body portion to improve stability against tilting of the pin blocks.

The housing base part preferably comprises a protective base wall at its mounting face, the base wall having passages or orifices to allow the pins to pass therethrough.

In certain embodiments, the actuator mechanism may comprise a rotatable separating cam with a generally oval shape positioned between cam surfaces of the respective pin blocks.

The mechanism for returning the pin blocks from the engaged to the disengaged position may be a spring element or elements pulling or pushing the pin blocks towards each other. In another embodiment, the return mechanism may include a pull arm and catch wall portion extending therefrom adapted to abut against an end of the respective pin block. A protrusion extending from the rotatable actuator engages a protrusion on the pull arm thus drawing it and the corresponding pin block back to the disengaged position.

In other embodiments, the actuator mechanism may include a housing cover part mounted over the housing base part and movable from a disengaged position distant from a base wall of the housing base part, to an engaged position closer towards the base wall. Locking of the device in the engaged position may be ensured by engagement of latches extending from the cover part with complementary latching shoulders on the housing base part.

The housing cover part may be provided with camming slots engaging guide shafts of the pin blocks. In other embodiments, the actuator mechanism comprises actuator arms pivotally mounted at one end thereof to the housing cover part or to the base base part and at the other end to a pivot axis portion of the respective pin block. When the cover part is pushed towards the base wall, the actuator arms are caused to rotate and thus pushing the pin blocks down and apart The housing base part comprises mounting portions to enable assembly of the fixing device to an object to be fixed. The object to be fixed may be in the form of a tray to hold articles therein, or an upright wall element to hold a load against a wall or in a corner of a compartment such as the trunk of an automobile. The shape, dimensions and properties of the object to be fixed can be very diverse and adapted to the various applications in which the invention can be used. By way of example, one can mention the fixing of objects (e.g. packet, bag, box, vase, fire extinguisher, furniture etc.) to carpeted floors in a domestic environment, or solutions (e.g. wall, bar, tray, etc) for securing goods transported in a vehicle, aeroplane, or boat.

An advantageous embodiment of an object for securing loads, especially shopping bags, in the trunk of a vehicle, is a tray (container, bin) for containing articles such as a shopping bag, comprising a fixing system as described above, and a lever arm coupled to the actuator mechanism of the fixing system, mounted on an underside of the tray. The lever arm advantageously comprises at least one grip accessible from an outer side of the tray so that it can be easily engaged and released.

Further advantageous aspects of the invention will be apparent from the claims, the following detailed description, and the figures, in which:

FIGS. 1a to 1f illustrate a first embodiment of the fixing system according to the invention;

FIG. 2 illustrates a second embodiment of a fixing system according to the invention;

FIGS. 5a to 5c illustrate a fifth embodiment of a fixing system according to the invention;

FIGS. 7a and 7b illustrate a seventh embodiment of a fixing system according to the invention;

FIGS. 8a and 8b illustrate an object in the form of a tray to be fixed to a penetrable surface by a fixing system according to this invention;

FIGS. 9a and 9b illustrate an object in the form of a collapsible wall to be fixed to a penetrable surface by a fixing system according to this invention; and FIG. 10 illustrates an object in the form of a corner wall portion to be fixed to a penetrable surface by a fixing system according to this invention.

Figure 1B:
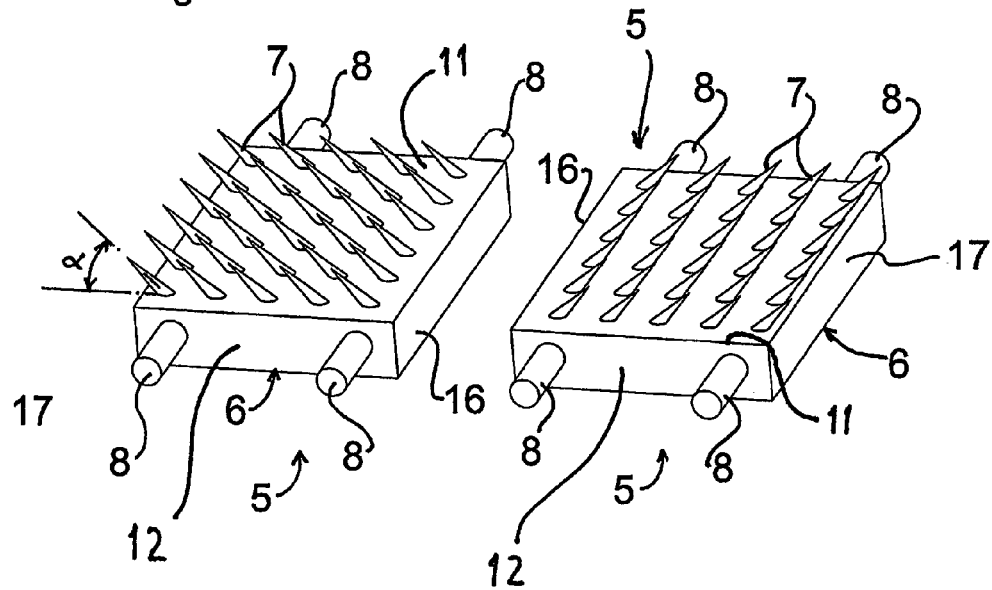

Referring to the figures, a fixing device 1 according to various embodiments of this invention comprises, generally, a housing 4 comprising a base part 3, a pair of pin blocks 5 mounted in the housing, and a pin block actuator mechanism 9 for displacing the pin blocks from a disengaged position to an engaged position. Each pin block comprises a rigid body portion 6, guide portions 8 for guiding movement of the pin block relative to the housing base part 3, and a plurality of pins 7 projecting at an oblique angle from a pin face 11 of the body portion, whereby the pins of one pin block point away from the pins of the other pin block.

The guide portions 8 of the pin blocks 5 are preferably in the form of shafts or extensions protruding from opposite sides 12 of the body portion 6, that are guided in complementary guide portions 13 in the form of slots or grooves 14 provided in inner side walls 15 of the housing base part 3. In order to increase guiding stability and in particular to prevent the pin block tilting relative to the penetrable surface, guide shafts 8 are provided proximate opposite ends 16, 17 of the body portion 6.

Alternatively, the guide portions on the pin blocks may be in the form of slots in which rail like extensions, protruding from the housing base part side walls, slide. The guide portions may however be provided with many other complementary forms allowing translation of the pin blocks apart without departing from the scope of the invention.

Figure 5A:
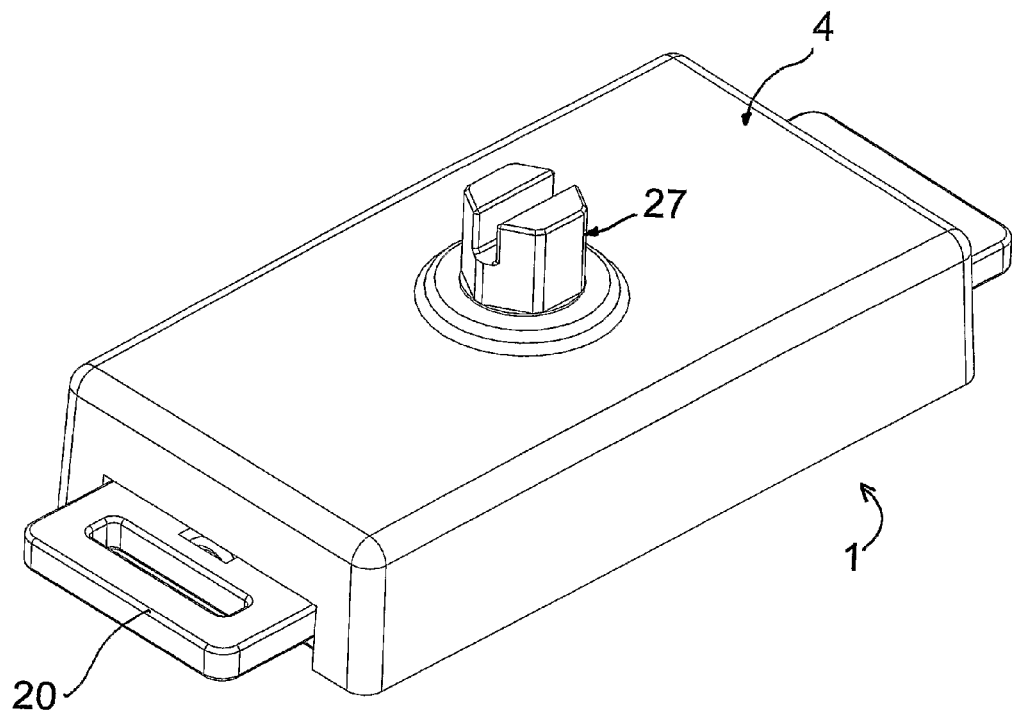
Figure 5B:
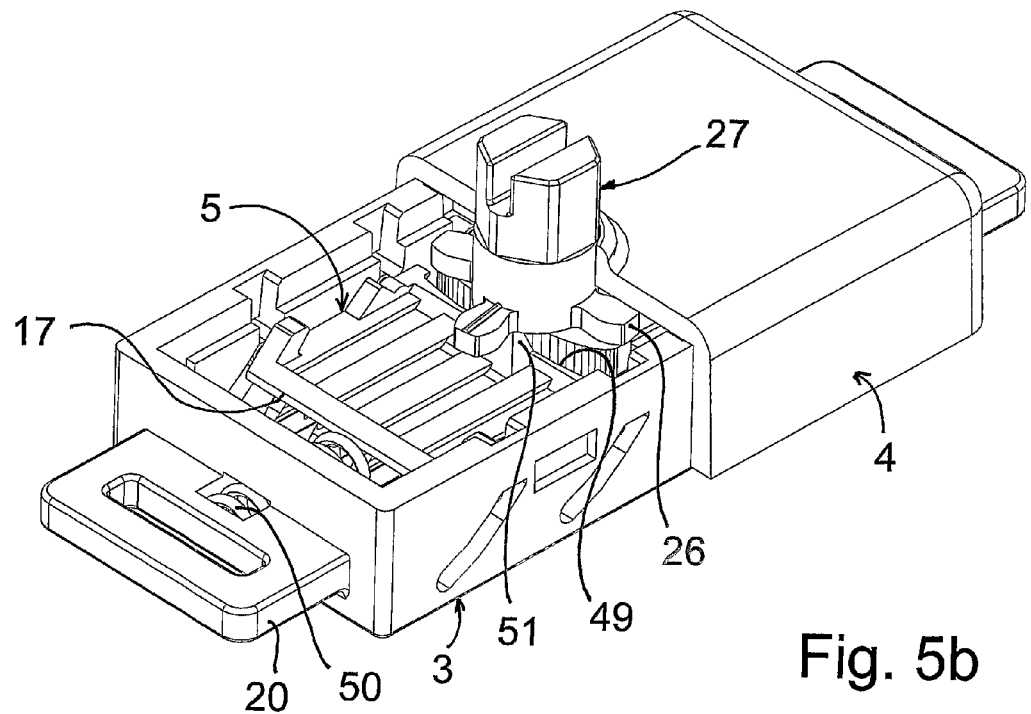

The pin blocks 5 may be guided to move in a plane with respect to the housing base part 3, as in the embodiment illustrated in FIGS. 5a-5c, or at an oblique angle as in the other embodiments shown. The penetration of the pins into the penetrable surface is effected by the moving apart of the pin blocks, whereby the oblique angle of the pins pulls the fixing device towards the penetrable surface. In many applications, for safety reasons, it is preferable to have an oblique trajectory of the pin blocks with respect to the housing base part since this allows the pin blocks to be retracted into the housing base part beneath the mounting face 18.

For greater safety, the housing base part may be provided with a protective base wall 18' having passages or orifices 19 to allow the pins to pass therethrough. The protective base wall 18' also advantageously helps to strengthen the housing base part, which is important since the housing is adapted to be mounted to an object to be fixed to the penetrable surface. For this purpose, the housing base part comprises mounting portions 20 that for example extend from ends of the base part, and that may be provided with any shape adapted to the chosen means (such as bolts, rivets, latches, welds etc) for fixing the device to an object. The design of the mounting portions may thus be chosen as a function of the object to be fixed.

The guide portions are designed to guide the pin block in a direction that is approximately parallel to the direction of the pins 7, although the direction may vary slightly over the travel of the pin block from the disengaged to the engaged positions. In a preferred embodiment, the guide slots may have a slightly generally curved shape such that the angle of the direction of movement of the pin block with the penetrable surface at the beginning of its travel, from the disengaged to the engaged position, is greater than at the end of travel. The latter design minimises the size of the fixing device by optimising the trajectory of the pins into the penetrable surface, whereby the rate of penetration is greater at the beginning of the engagement movement where the pins must first engage in the textile or fibrous surface (and penetration is easy) than at the end of the movement where the compression of the housing against the penetrable surface increases the resistance to penetration and the force needed for separating the pair of pin blocks apart is the greatest. The angle of the guide slots with respect to the mounting face 18 at the end of the trajectory (in the engaged position) is advantageously smaller than the angle of the pins, such that as the pins insert into the fibrous surface towards the end of the trajectory latter is compressed more effectively against the mounting (base) wall of the fixing device.

In applications for immobilizing loads in a moving vehicle, for example in the trunk of an automobile, the fixing device must be able to withstand high loads. Moreover, the depth of penetration of the pins is limited be the thickness of the carpets or other textile or fibrous surfaces to which the fixing device is intended to be fixed. A relatively small depth of penetration of the pins in the penetrable surface will increase the versatility of use of the fixing device, but reduce the fixing force of the fixing device to the penetrable surface. In the majority of automobiles presently commercialised, carpets are provided on the floor of the trunk, whereby the depth of the textile portion is usually in the range of 3-6 mm. For automobile applications, the optimal length of the pins is thus such, that the depth h, from the tip of the pins to the outer mounting face 18 in the engaged position, is around 4 mm. The pins preferably have a substantially conical shape with a cone angle preferably between 10 and 20 degrees, more preferably around 15 degrees, and a tip radius preferably inferior to 15 µm in order to optimise their resistance to bending stresses and their ability to penetrate and grip in the carpet. The angle of inclination $\alpha$ of the pins with respect to the body portion 6 is preferably in the range of 30 to 50 degrees, more preferably around 45 degrees.

The pin block may advantageously be made as an integral part of metallic material, for example a sintered injected metallic powder and resin mix, or of an injected fibre reinforced plastics or composite material. An integral metallic pin block has very high resistance to stresses and to wear, in a compact form allowing a relatively high density of pins to be provided over a relatively small surface area. Other methods and materials may however be used, and the pin block could be made of different parts and materials assembled together. For example, the pin block could be made of separately manufactured pins inserted in cavities of a body portion or partially overmolded by the body portion, or of a stamped and formed base with pins, partially overmolded with an injected plastics or composite body portion.

The housing parts are preferably made of an injected plastic material that may be fibre reinforced. The housing base part 3 in particular is preferably made of a high resistance material, such as a fibre reinforced semi-crystalline polyamide, since it bridges the forces from the pin block to the object to be fixed.

Figures 1C, 1D:
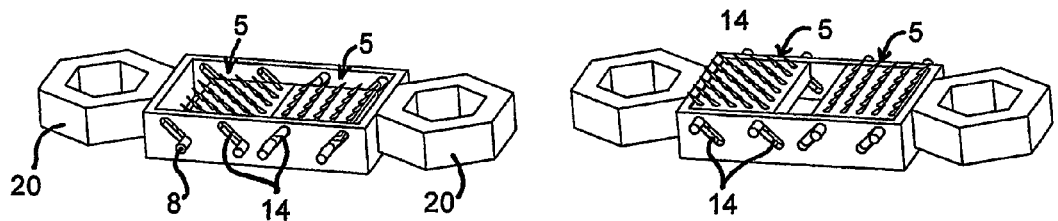

Referring now more specifically to FIGS. 1*a* to 1*f*, a first embodiment of the invention is illustrated, whereby FIG. 1*d* shows the pin blocks 5 in an engaged position (i.e. when the system is fixed to a penetrable surface) and FIGS. 1*a* and 1*c* show the blocks in a disengaged position, when the pins are retracted.

As one can see on the complete device in FIG. 1*a*, the housing 2 comprises a second housing part 4 in the form of a cover mounted over the housing base part 3 and comprises horizontal guide slots 21 receiving the pin block guide shafts 8. The second housing part 4 acts as the pin block actuator mechanism for moving the pin blocks to the engaged position and back to the disengaged position. A spring 22, which acts as a actuator return mechanism, is arranged between the pin block actuator and the upper inner face of the housing base part 3.

Figures 1E, 1F:
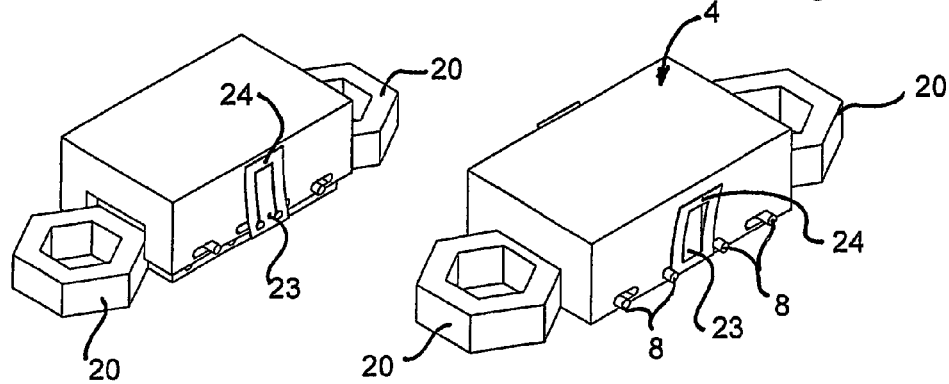

Finally, as one can see in FIGS. 1*e* and 1*f*, the pin block actuator 4 is provided with blade springs 23 which, once positioned between the guide shafts 3, locks the pin blocks 5 in the engaged position, thus firmly fixing the fixing device to the penetrable surface.

In order to fix the device 1 on the penetrable surface, one initially places it at the desired place and then one presses on the pin block actuator 4 towards the penetrable surface. At the end of the displacement, the blade springs 23 snap into position between the guide shafts 8 of the pin blocks thus preventing them from moving together back to the disengaged position. The pins 7 being inserted into the penetrable surface, the fixing device is thus fixed to the penetrable surface.

In order to remove the device from the penetrable surface, the upper grip portion 24 of the blade springs 23 are moved together, which has the effect of lifting the locking end portion 25 out of engagement with the guide shafts thus freeing the movement of the pin blocks 5. The return spring 22 thus moves the pin block actuator 4 away from the housing base part 3, which has the effect of retreating the pins blocks from the penetrable surface.

FIG. 2 illustrates a device similar to that of FIG. 1, but which differs in that the blocks are moved apart or together and then held in place by means of an actuator mechanism that includes a separating cam 26 with a generally oval shape. The latter is rotated by means of a grip 27 rigidly attached or integrally formed with the separating cam. Each pin block 5 is provided with a camming portion 28 in the form of a shaft surrounded by an elastic band 29 that ensures the connection between the pin blocks and the actuator mechanism.

On turning the grip 27, the cam 26 which is integral therewith, separates the pin blocks 5 or allows them to move towards each other. The indents 30 positioned at the smallest and largest radii of the cam 26 ensure a stable position thereof on the shafts 28 and thus prevent an accidental unlocking. The action of moving the pin blocks 5 apart has the effect of inserting the pins into the penetrable surface, thus fixing the device to said surface.

FIGS. 7*a* and 7*b* show another embodiment in which the functioning principle is similar to the previous variants but which differs in that the device is in the general form of a cylinder and comprises a concentric housing 2', a rotatable pin block 5', a second set of pins 7" fixed to an end plate 33 acting as a second pin block, and an actuator ring 4'. The concentric housing has a body portion 31 fixed to end plates 32, 33, whereby the distance between the plates is determined by the thickness of the body portion and spacers 34. The annular actuator ring is rotatably position between the end plates. The pin block 5' is provided with pins 7' inclined with respect to the face of the plate 33 and positioned within a coaxial cylindrical surface in relation to its edge. The pin block 5' and the actuator ring 4' are threaded at their interfaces such that a rotation of the ring is translated into a movement of the pin block 5' relative to the second set of pins 7" in the direction of one end plate or the other.

In order to fix the device, one places the device on a penetrable surface such that the fixed pins 7" are placed on the penetrable surface, and then turns the actuator ring 17 in a clockwise or anticlockwise direction. At the end of the ring's travel, the pin block 5' is pressed against the lower plate 33 and the pins 7', 7" are inserted into the penetrable surface. The internal frictional forces ensure that the system does not unlock due to the forces transmitted by the pins. To remove the fixing device, one turns the actuator ring in the opposite direction to the fixing movement. At the end of travel, the pin block 5' is pressed against the upper plate 32 and the pins are retracted from the penetrable surface. The pins 7" may also be provided on a rotatable ring that rotates in an opposite direction to the pin block 5'.

Figure 3A:
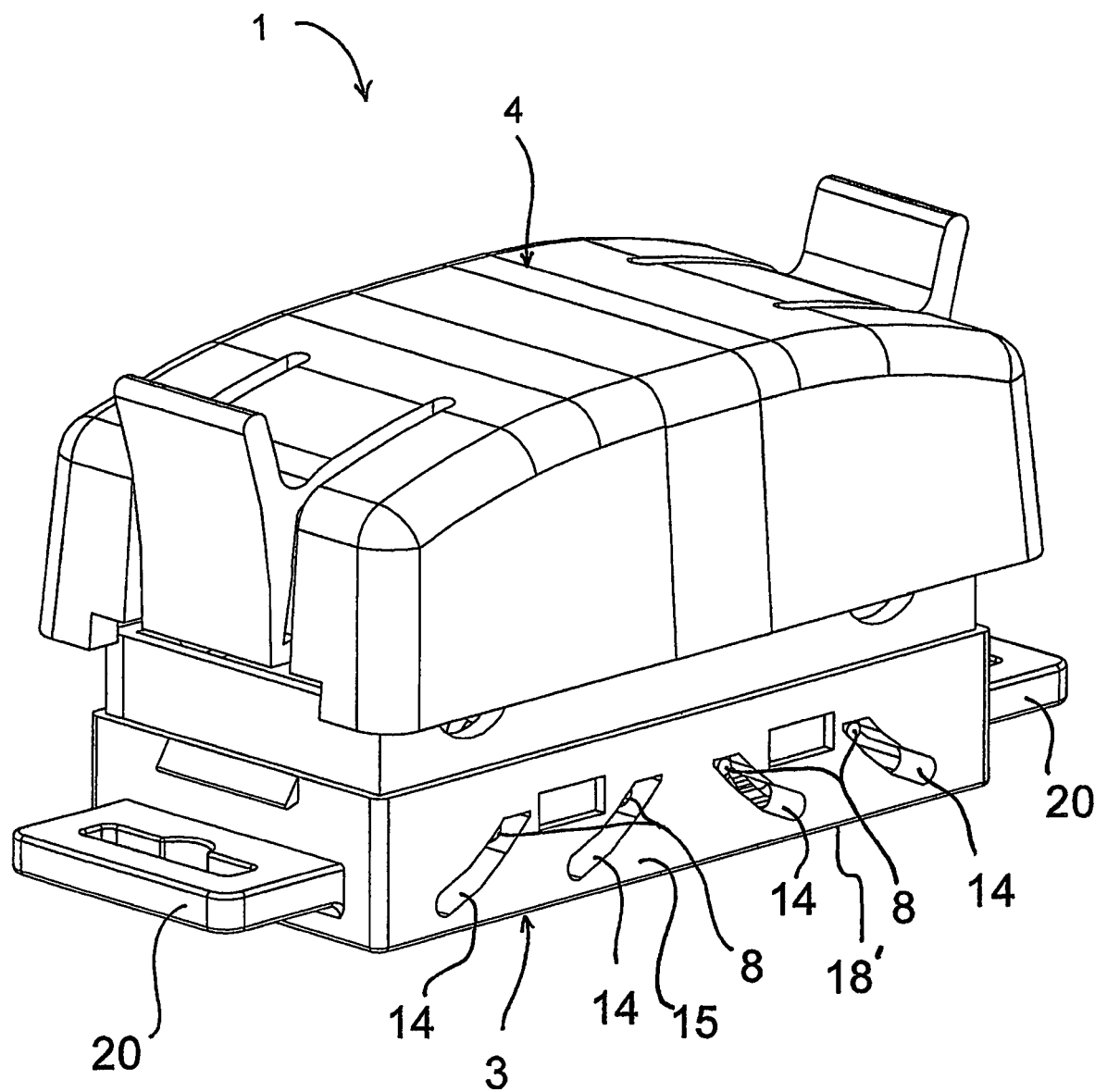
FIGS. 3a to 3c illustrate a third embodiment of a fixing system according to the invention.
Figure 3B:
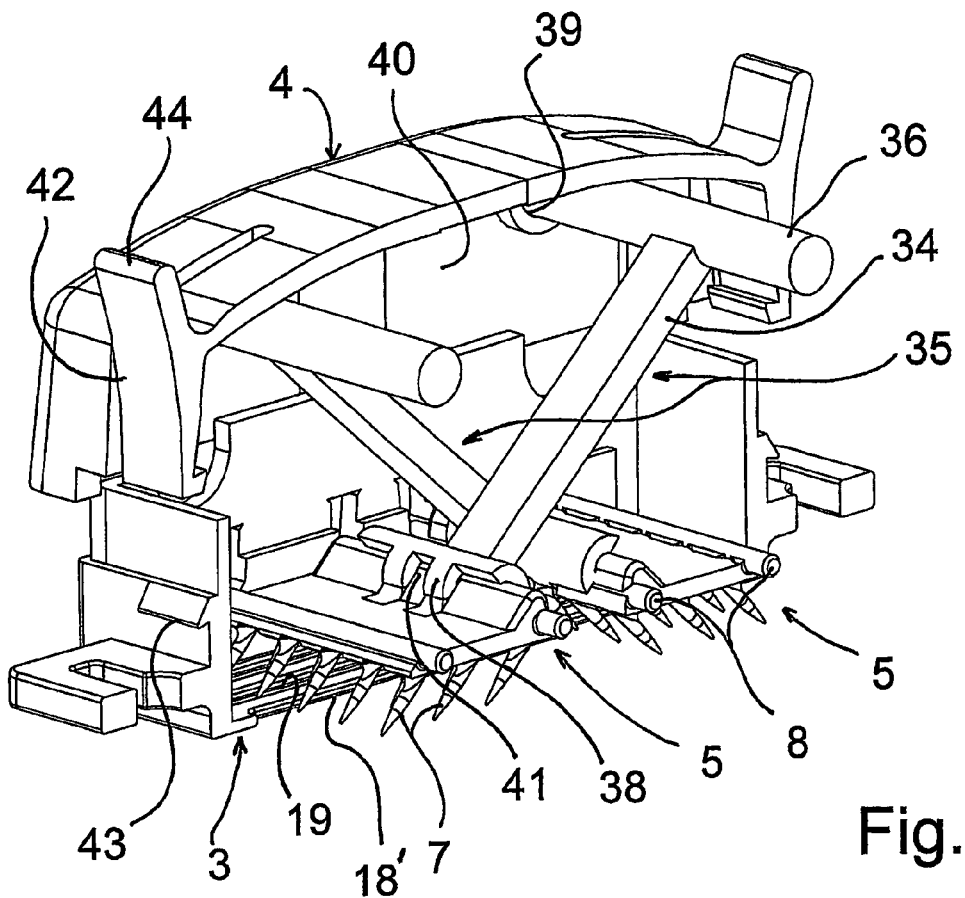
Figure 3C:
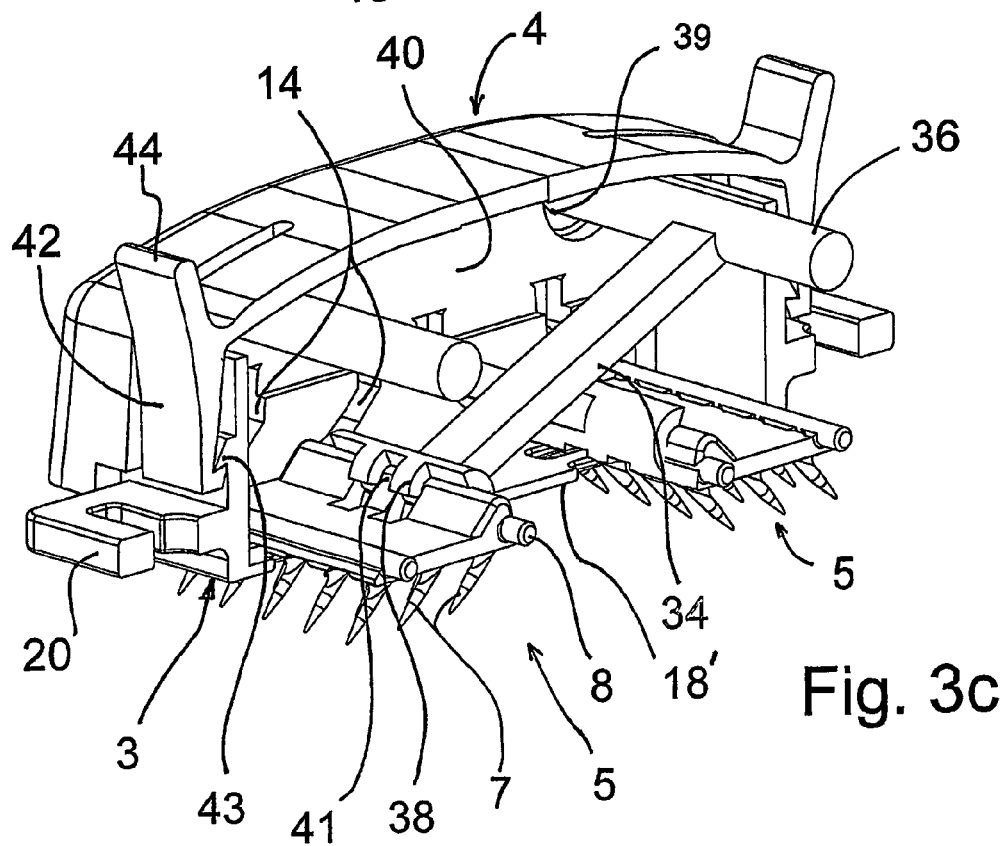

Referring to FIGS. 3*a* to 3*c*, another embodiment of a fixing device similar in principle to that of FIG. 1, but which differs in that the pin blocks are moved apart or together and then held in place by means of an actuator mechanism that includes a housing part 4 and actuator arms 35 pivotally mounted in the housing part 4. Each actuator arm 35 comprises an arm portion 34 integrally formed with a pivot axis 36 at one end and a pin block connector portion in the form of a clamp 38 at the other end. The pivot axis is received in complementary bearing cavities 39 in opposite side walls 40 of the housing part, whereas the clamp portion 38 pivotally clamps on a pivot axis portion provided on the pin block 5.

To fix the device to a penetrable surface, the cover part 4, which is initially in the disengaged position as shown in FIGS. 3a and 3b, is pressed down until in latches into the engaged position as shown in FIG. 3c. The cover part is provided with elastic integrally formed latches 42 that engage with complementary latching shoulders 43 provided on the housing base part 3 to lock the actuator mechanism thus securing the fixing device in the engaged position shown in FIG. 3c. As the cover part 4 descends towards the base part 3, the actuator arms pivot about the pivot axis 36 and push the respective pin blocks 5 towards the protective wall 18', whereby the trajectory of the pin blocks is determined by the guide slots 15 in the housing base part side walls.

Figure 4A:
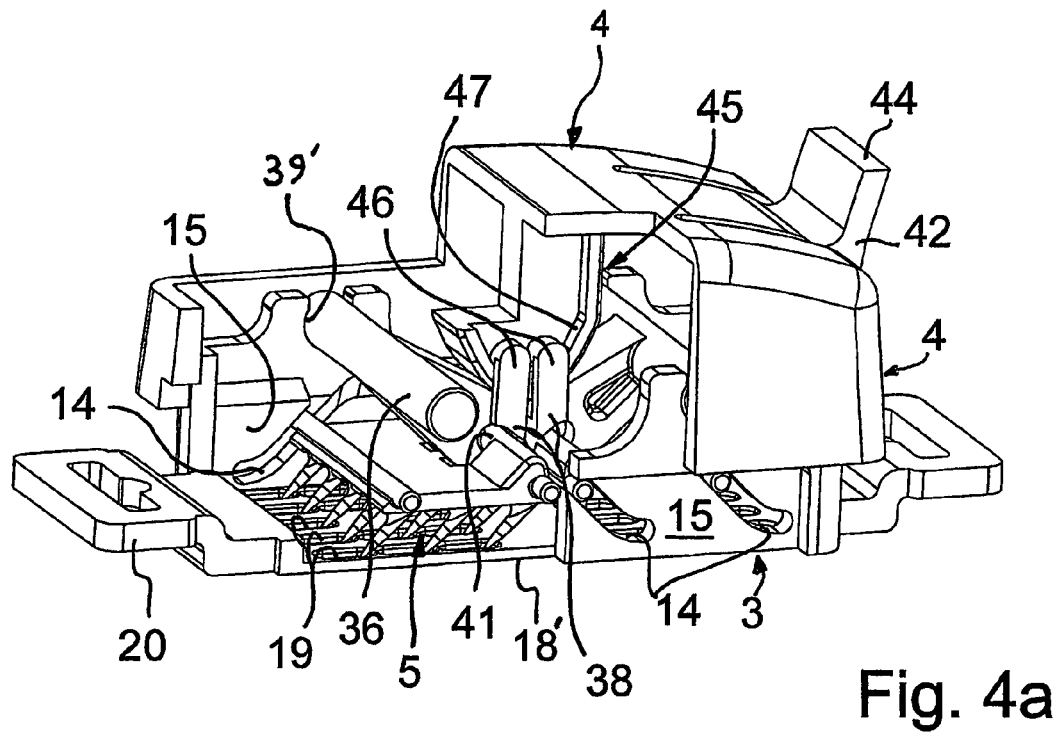
FIGS. 4a and 4b illustrate a fourth embodiment of a fixing system according to the invention.
Figure 4B:
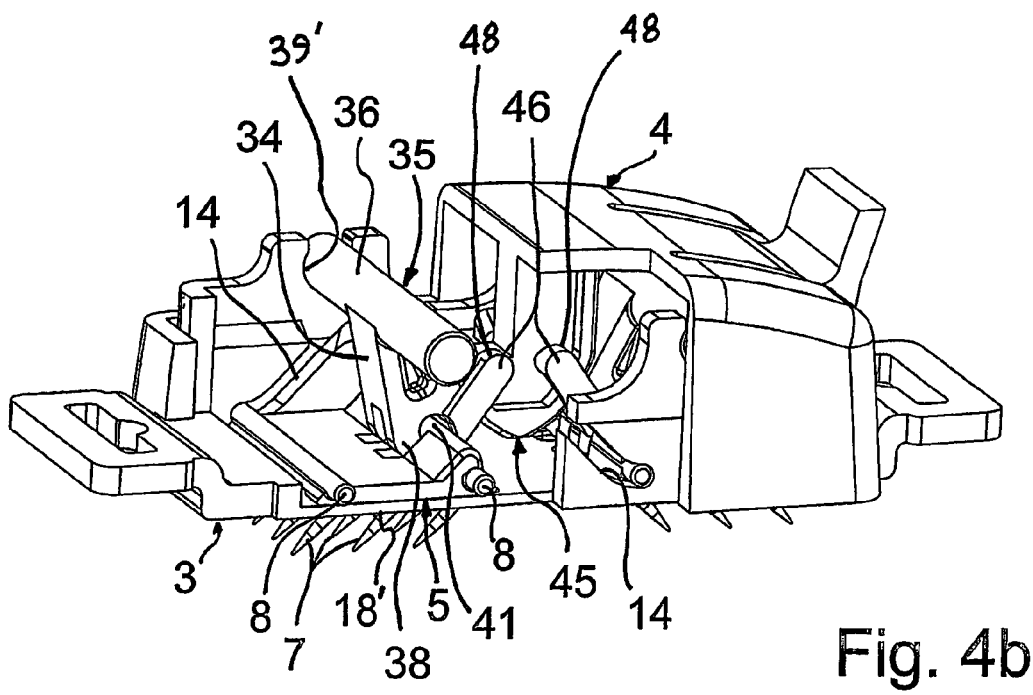

Referring to FIGS. 4a and 4b, another embodiment of a fixing device similar in principle to that of FIGS. 3a to 3c, but which differs in that the actuator mechanism includes actuator arms 35 pivotally mounted in the housing base part 3, and a cover part 4 that has a push protrusion 45 that pushes directly against the actuator arms. The push protrusion 45 is preferably generally wedge shaped. Each actuator arm 35 comprises an arm portion 34 integrally formed with a pivot axis 36 at one end and a pin block connector portion in the form of a clamp at the other end. The pivot axis is received in complementary bearing cavities 39' in opposite side walls 15 of the housing base part 3, whereas the clamp portion 38 pivotally and slidably clamps on a pivot axis portion 41 provided on the pin block 5. Each actuator arm further comprises a disengagement arm portion 46 extending from the pin block clamping end to a hook end portion 48 that engages retaining shoulders 47 of the push protrusion.

To fix the device to a penetrable surface, the cover part 4, which is initially in the disengaged position as shown in FIG. 4a, is pressed down until in latches into the engaged position as shown in FIG. 4b. The cover part is provided with elastic integrally formed latches 42 that engage with complementary latching shoulders 43 provided on the housing base part 3 to lock the actuator mechanism thus securing the fixing device in the engaged position shown in FIG. 4b. As the cover part 4 descends towards the base part 3, the push protrusion 45 pushes the actuator arms so that they pivot about the pivot axis 36 and push the respective pin blocks 5 towards the base wall 18', whereby the trajectory of the pin blocks is determined by the guide slots 15 in the side walls of the housing base part. In the engaged position as shown in FIG. 4b, the wedge shape push protrusion is positioned between the actuator arms and pin blocks 5 thus rigidly blocking the pin blocks in the engaged position.

To disengage the device from the penetrable surface, the user prises the grips 44 of the latches until the latches disengage the complementary shoulder 43 and lifts up the housing part 4. As the push protrusion 45 rises with the housing part 4, the retaining shoulders 47 pull up on the hook end portion 48 of the actuator arm thus causing it to pivot about the pivot axis 36, with respect to the housing base part 3, back to the disengaged position shown in FIG. 4a.

FIGS. 5a and 5b illustrate a fixing device similar to that of FIG. 2, whereby the pin blocks 5 are moved apart or together and then held in place by means of an actuator mechanism that includes a separating cam 26 with a generally oval shape. The latter is rotated by means of a grip 27 rigidly attached or integrally formed with the separating cam. An end face 49 of each pin block 5 acts as a camming surface against which the separating cam 26 abuts. The end face 49 is provided with an extended central portion 51 so as to increase the surface area available for abutment of the separating cam thereagainst in the engaged position, thus advantageously decreasing the pressure on the cam surfaces where the applied forces are the greatest. Compression springs 50 positioned between the end wall of the housing base part 3 and an end 16 of the pin block distant from the camming surface ensures the connection between the pin blocks and the actuator mechanism.

On turning the grip 27, the cam 26 which is integral therewith, separates the pin blocks 5 or allows them to move towards each other. In the engaged position, the high point of the separating cam is in abutment with the pin block cam surfaces such that the moment of rotation on the separating cam is essentially zero. The frictional force between the cam surfaces ensures a stable position in the engaged position. A small flat positioned at the high point of the separating cam can be provided to improve stability and locking, particularly in an environment with vibration. Alternatively, the cam can be turned slightly past the high point, whereby an abutment arm on the actuator cooperates with a complementary stop on the housing or on the pin block to arrest the rotation of the separating cam in the engaged position.

The grip portion 27 of the actuator mechanism may be provided with any shape best adapted for coupling to a knob, wheel or lever arm to facilitate turning the actuator.

Figure 6A:
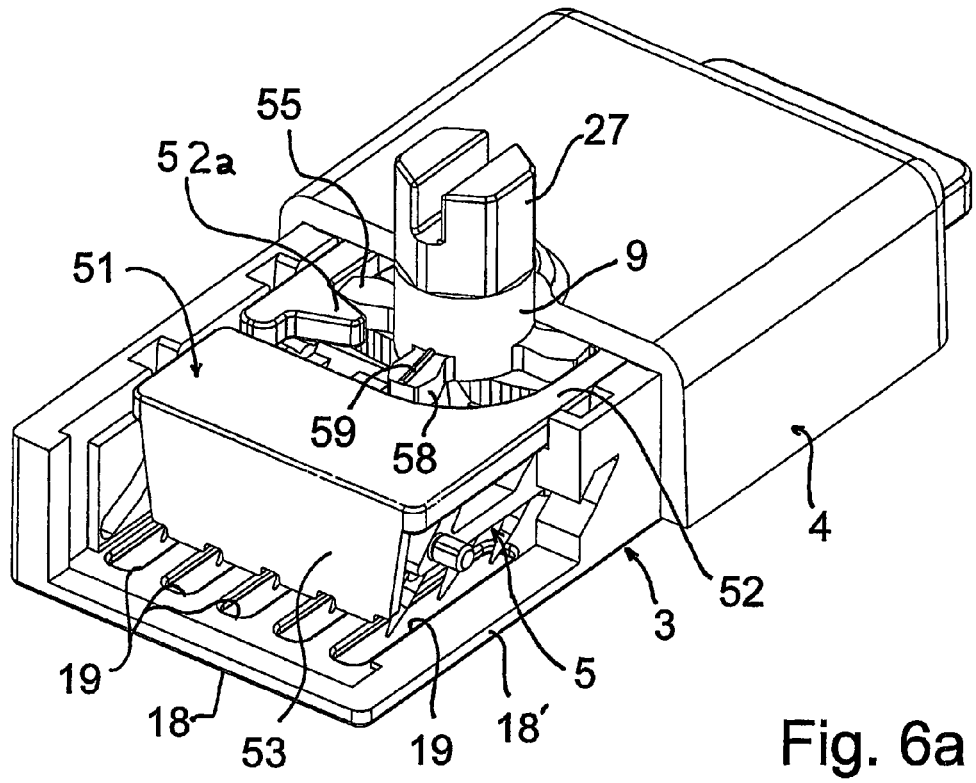
FIGS. 6a and 6b illustrate a sixth embodiment of a fixing system according to the invention.
Figure 6B:
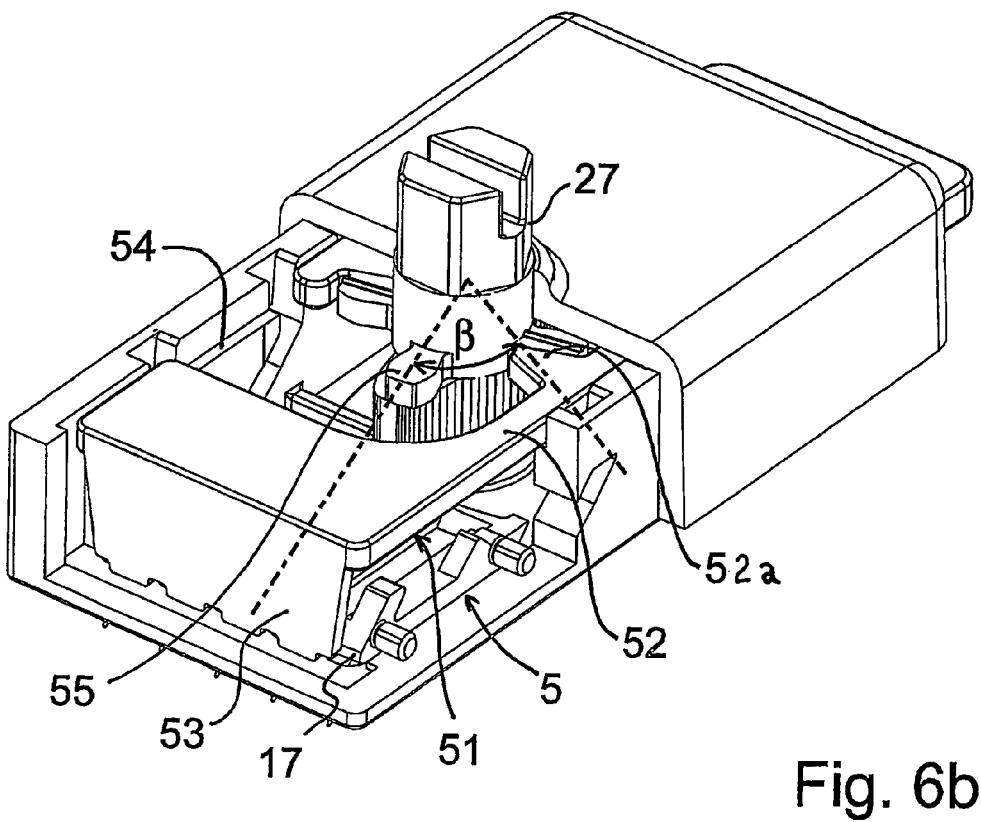

FIGS. 6a and 6b illustrate a fixing device very similar to the fixing device shown in FIGS. 5a, 5b, the main difference lying in the mechanism for returning the pin blocks 5 to the disengaged position. In this variant, the return mechanism comprises a pull member 51, comprising a pull arm 52 and a catch portion 53 extending therefrom in abutment with an end 17 of the pin block distant from the cam surface, the pull member being slidably mounted in the housing base part 3. Guide rails or ledges 54 may be provided in the side walls of the housing base part to support and guide the pull member.

The pull arm comprises a protrusion 52a that acts as a gear tooth engaged by a complementary protrusion 55 in the form of a gear tooth extending from the axis of the actuator 9. In the engaged position as shown in FIG. 6b, the catch portion 53 of the pull member 51 is pushed to a position proximate the housing end wall by the end 16 of the pin block 5, and the actuator gear tooth 55 is disengaged from the protrusion 52a of the pull arm 52. To disengage the fixing device, the actuator member is rotated (in the clockwise direction in FIG. 6b) such that the high points 56 of the separating cam disengage from the respective end face of the pin blocks. After rotation of the actuator over a certain dead angle β, the actuator gear tooth 55 engages the pull arm protrusion 52a, and from that point on draws the pull member 51, and therewith the pin block 5 in abutment against the catch portion 53, towards the disengaged position shown in FIG. 6a.

In the rotating actuator variants, as shown in FIGS. 5a, 5b and 6a, 6b, a ratchet mechanism that serves on the one hand as a brake and on the other hand generates a clicking noise that indicates turning of the actuator to the user. The ratchet mechanism may for example comprise a protuberance 59 on the actuator that rubs across a plurality of complementary protuberances (not visible in the figures) on inner surface of the housing cover part 4. For convenience, in the example of FIGS. 5 and 6, the protuberance is provided on a tooth 58 extending from the axis of the rotatable actuator.

Referring to FIGS. 8a and 8b, a fixing device 1 with a rotatable actuator corresponding to the variants of FIG. 5a, 5b or 6a, 6b, is shown securely assembled to the underside 61 of a tray 60 that is particularly well adapted to securing loads, such as a shopping bag filled with groceries, in the trunk of a passenger vehicle. The underside of the tray is provided with means for securely mounting the fixing device 1 to the tray, such as a latching member 62 that clips onto the complementary mounting portions 20 of the fixing device. The underside of the tray comprises feet 65 that are flush with the lower face of the fixing device, in other words that raise the bottom wall of the tray such that the bottom face of the fixing device lies substantially on (against) the penetrable surface. The tray further comprises a lever arm 63 connected to the coupling portion 27 of the rotatable actuator, the lever arm having grip portions 64 at opposed ends thereof. The grip portions 64 of the lever arm are thus accessible from opposite sides of the tray when it is positioned on a penetrable surface, and can thus be actuated to fix or to release the tray to the penetrable surface. This advantageously allows articles to be put into the tray before it is secured to a penetrable surface, subsequently to move the tray to the desired position and then to secure it to the penetrable surface by accessing either grip portion 64 (i.e. from whichever side of the tray is most accessible) and rotating the lever arm from the disengaged position shown in FIG. 8b to the engaged position shown in FIG. 8a. In the disengaged position as shown in FIG. 8b, the grip portions 64 protrude visibly out of the side of the tray in a manner that is different from the engaged position, so as to provide an indication to the user that the tray is not secured.

The fixing device according to the invention may be assembled to many objects of different shapes and sizes adapted to immobilize various loads (groceries, bags, boxes, fire extinguishers etc) on a carpet or other textile or fibrous surface, most usefully in moving vehicles, and particularly in the trunk of a moving vehicle. By way of example, FIGS. 9a, 9b and FIG. 10 illustrate fixing devices according to the variants shown in FIG. 3 or 4, assembled to a base 67, 67' of an upstanding wall device 66, 66'. In the embodiment of FIGS. 9a, 9b, a foldable wall 68 is pivotally mounted to the base so that it can be secured in the upright position as shown in FIG. 9a or folded into the plane of the base as shown in FIG. 9b when not in use. A locking mechanism (not shown) may be provided in the pivot mount in order to enable the foldable wall to be secured and locked in the upright and folded positions. In the example of FIG. 10, an upstanding wall 69 forms a corner that may be applied against the corner of a box or similar shaped load, in order to wedge or push the load against a wall or corner of a compartment in which the load is transported.

The invention claimed is:

1. A fixing system adapted to be fixed in a removable manner on a penetrable surface, said fixing system comprising a housing base part, a pair of pin blocks mounted in the housing base part, each pin block comprising a rigid body portion and a plurality of pins inclined obliquely in relation to said body portion, the pins of one of said pin blocks oriented in a direction opposed to a direction of the pins of the other pin block, and an actuator mechanism adapted to move the pin blocks apart or together, from a disengaged position to an engaged and stable position.

2. The fixing system according to claim 1, wherein the pin blocks are provided with guide portions cooperating with complementary guide portions in side walls of the housing base part.

3. The fixing system according to claim 2, wherein the guide portions of the pin blocks are in the form of shafts or extensions protruding from opposite sides of the respective body portion, and the complementary guide portions in the side walls are in the form of slots or grooves provided in inner side walls of the housing base part.

4. The fixing system according to claim 3, wherein an angle of the slots or grooves relative to a mounting face of the housing base part is greater at a disengaged end than at an engaged end.

5. The fixing system according to claim 2, wherein the guide portions of each pin block are provided proximate opposite ends of the body portion.

6. The fixing system according to claim 1, wherein the housing base part comprises a protective base wall having passages or orifices to allow the pins to pass therethrough.

7. The fixing system according to claim 1, wherein the housing base part comprises mounting portions for fixing to an object.

8. The fixing system according to claim 7, wherein the mounting portions extend from opposite ends of the base part.

9. The fixing system according to claim 1, wherein the actuator mechanism comprises a rotatable separating cam with a generally oval shape positioned between cam surfaces of the respective pin blocks.

10. The fixing system according to claim 1, comprising a return mechanism adapted to move the pin blocks from the engaged to the disengaged position, the return mechanism comprising a spring element or elements pulling or pushing the pin blocks towards each other.

11. The fixing system according to claim 9, comprising a return mechanism adapted to move the pin blocks from the engaged to the disengaged position, the return mechanism including a pull member comprising a pull arm and catch wall portion extending therefrom adapted to abut against an end of the respective pin block, and a protrusion extending from the actuator mechanism adapted to engage a complementary protrusion on the pull arm.

12. The fixing system according to claim 1, comprising a blocking mechanism adapted to block the pin blocks in the engaged position.

13. The fixing system according claim 1, wherein the actuator mechanism comprises a housing cover part mounted over the housing base part and movable from a disengaged position distant from a base wall of the housing base part, to an engaged position closer towards the base wall.

14. The fixing system according to claim 3, wherein a housing cover part is provided with camming slots engaging guide shafts of the pin blocks.

15. The fixing system according to claim 3, wherein the actuator mechanism further comprises actuator arms pivotally mounted at one end thereof to a housing cover part or base part and at another end to a pivot axis portion of a respective on of said pin blocks.

* * * * *

UNITED STATES PATENT AND TRADEMARK OFFICE
CERTIFICATE OF CORRECTION

| | | |
|---|---|---|
| PATENT NO. | : 7,766,589 B2 | Page 1 of 1 |
| APPLICATION NO. | : 11/664764 | |
| DATED | : August 3, 2010 | |
| INVENTOR(S) | : Igor Lobl et al. | |

It is certified that error appears in the above-identified patent and that said Letters Patent is hereby corrected as shown below:

In column 10, line 56, please replace the word "on" with the word "one".

Signed and Sealed this
Sixth Day of December, 2011

David J. Kappos
*Director of the United States Patent and Trademark Office*